US010216811B1

(12) United States Patent
Mark et al.

(10) Patent No.: US 10,216,811 B1
(45) Date of Patent: Feb. 26, 2019

(54) COLLABORATING USING DIFFERENT OBJECT MODELS

(71) Applicant: Palantir Technologies Inc., Palo Alto, CA (US)

(72) Inventors: Alexander Mark, New York, NY (US); Andrew Elder, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/481,014

(22) Filed: Apr. 6, 2017

Related U.S. Application Data

(60) Provisional application No. 62/442,554, filed on Jan. 5, 2017.

(51) Int. Cl.
G06F 17/30 (2006.01)

(52) U.S. Cl.
CPC .... *G06F 17/30554* (2013.01); *G06F 17/3053* (2013.01)

(58) Field of Classification Search
CPC ......... G06F 17/30569; G06F 17/30604; G06F 17/30699; G06F 17/30867; G06F 17/30554; G06F 17/3053
See application file for complete search history.

(56) References Cited

U.S. PATENT DOCUMENTS

| 4,881,179 | A |   | 11/1989 | Vincent |
| 5,241,625 | A |   | 8/1993 | Epard et al. |
| 5,845,300 | A |   | 12/1998 | Comer |
| 5,875,446 | A | * | 2/1999 | Brown ............. G06F 17/30864 |
| 5,995,973 | A | * | 11/1999 | Daudenarde ...... G06F 17/30607 |
| 5,999,911 | A |   | 12/1999 | Berg et al. |
| 6,065,026 | A |   | 5/2000 | Cornelia et al. |
| 6,101,479 | A |   | 8/2000 | Shaw |

(Continued)

FOREIGN PATENT DOCUMENTS

| AU | 2013251186 | 11/2015 |
| CN | 102054015 | 5/2014 |

(Continued)

OTHER PUBLICATIONS

"GrabUp—What a Timesaver!" <http://atlchris.com/191/grabup/>, Aug. 11, 2008, pp. 3.

(Continued)

*Primary Examiner* — Shiow-Jy Fan
(74) *Attorney, Agent, or Firm* — Sheppard Mullin Richter & Hampton LLP

(57) ABSTRACT

Systems and methods are provided for collaborating with different object models. Data corresponding to one or more source objects is received. The source objects is stored in a first object model, and each of the source objects is associated with information describing an entity. Matches between the respective information associated with the one or more source objects and respective information associated with one or more target objects are determined based on a query. The target objects are stored in a second object model. The one or more source objects are ranked based at least in part on the matches. A list of the ranked source objects are provided through an interface, the interface indicating a number of matching target objects for each of the source objects.

18 Claims, 8 Drawing Sheets

(56) References Cited

U.S. PATENT DOCUMENTS

| | | |
|---|---|---|
| 6,232,971 B1 | 5/2001 | Haynes |
| 6,237,138 B1 | 5/2001 | Hameluck et al. |
| 6,243,706 B1 | 6/2001 | Moreau et al. |
| 6,279,018 B1 | 8/2001 | Kudrolli et al. |
| 6,370,538 B1 | 4/2002 | Lamping et al. |
| 6,430,305 B1 | 8/2002 | Decker |
| 6,523,019 B1 | 2/2003 | Borthwick |
| 6,642,945 B1 | 11/2003 | Sharpe |
| 6,665,683 B1 | 12/2003 | Meltzer |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 6,980,984 B1 | 12/2005 | Huffman et al. |
| 7,086,028 B1 | 8/2006 | Davis et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,441,182 B2 | 10/2008 | Beilinson et al. |
| 7,441,219 B2 | 10/2008 | Perry et al. |
| 7,627,812 B2 | 12/2009 | Chamberlain et al. |
| 7,634,717 B2 | 12/2009 | Chamberlain et al. |
| 7,657,540 B1 | 2/2010 | Bayliss |
| 7,716,140 B1 | 5/2010 | Nielsen et al. |
| 7,765,489 B1 | 7/2010 | Shah |
| 7,770,100 B2 | 8/2010 | Chamberlain et al. |
| 7,877,421 B2 | 1/2011 | Berger et al. |
| 7,880,921 B2 | 2/2011 | Dattilo et al. |
| 7,899,796 B1 | 3/2011 | Borthwick et al. |
| 7,900,052 B2 | 3/2011 | Jonas |
| 7,941,336 B1 | 5/2011 | Robin-Jan |
| 7,958,147 B1 | 6/2011 | Turner et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,191,005 B2 | 5/2012 | Baier et al. |
| 8,225,201 B2 | 7/2012 | Michael |
| 8,290,838 B1 | 10/2012 | Thakur et al. |
| 8,302,855 B2 | 11/2012 | Ma et al. |
| 8,312,367 B2 | 11/2012 | Foster |
| 8,392,556 B2 | 3/2013 | Goulet et al. |
| 8,527,949 B1 | 9/2013 | Pleis et al. |
| 8,620,641 B2 | 12/2013 | Farnsworth et al. |
| 8,682,696 B1 | 3/2014 | Shanmugam |
| 8,688,573 B1 | 4/2014 | Ruknoic et al. |
| 8,732,574 B2 | 5/2014 | Burr et al. |
| 8,799,313 B2 | 8/2014 | Satlow |
| 8,807,948 B2 | 8/2014 | Luo et al. |
| 8,930,874 B2 | 1/2015 | Duff et al. |
| 8,938,686 B1 | 1/2015 | Erenrich et al. |
| 8,984,390 B2 | 3/2015 | Aymeloglu et al. |
| 9,058,315 B2 | 6/2015 | Burr et al. |
| 9,165,100 B2 | 10/2015 | Begur et al. |
| 9,286,373 B2 | 3/2016 | Elliot et al. |
| 9,294,361 B1* | 3/2016 | Choudhary ....... G06F 17/30572 |
| 9,348,880 B1 | 5/2016 | Kramer et al. |
| 9,348,920 B1 | 5/2016 | Kesin |
| 2001/0021936 A1 | 9/2001 | Bertram |
| 2002/0032677 A1 | 3/2002 | Morgenthaler et al. |
| 2002/0083039 A1 | 6/2002 | Ferrari |
| 2002/0095360 A1 | 7/2002 | Joao |
| 2002/0103705 A1 | 8/2002 | Brady |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason et al. |
| 2003/0093755 A1 | 5/2003 | O'Carroll |
| 2003/0126102 A1 | 7/2003 | Borthwick |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0205492 A1 | 10/2004 | Newsome |
| 2004/0236688 A1 | 11/2004 | Bozeman |
| 2004/0236711 A1 | 11/2004 | Nixon et al. |
| 2004/0243613 A1* | 12/2004 | Pourheidari ...... G06F 17/30864 |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0125715 A1 | 6/2005 | Di Franco et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0018986 A1 | 1/2007 | Hauser |
| 2007/0043686 A1 | 2/2007 | Teng et al. |
| 2007/0061752 A1 | 3/2007 | Cory |
| 2007/0113164 A1 | 5/2007 | Hansen et al. |
| 2007/0130206 A1 | 6/2007 | Zhou et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0071731 A1 | 3/2008 | Ma et al. |
| 2008/0091693 A1 | 4/2008 | Murthy |
| 2008/0109714 A1 | 5/2008 | Kumar et al. |
| 2008/0162544 A1* | 7/2008 | Weissman ......... G06F 17/30292 |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0215557 A1* | 9/2008 | Ramer ............. G06F 17/30749 |
| 2008/0249820 A1 | 10/2008 | Pathria |
| 2008/0276167 A1 | 11/2008 | Michael |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0024589 A1 | 1/2009 | Sood et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0083262 A1* | 3/2009 | Chang ............... G06F 17/30867 |
| 2009/0089651 A1 | 4/2009 | Herberger et al. |
| 2009/0106178 A1 | 4/2009 | Chu |
| 2009/0106242 A1* | 4/2009 | McGrew ........... G06F 17/30303 |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0164934 A1 | 6/2009 | Bhattiprolu et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |

(56) References Cited

U.S. PATENT DOCUMENTS

| | | |
|---|---|---|
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0098318 A1 | 4/2010 | Anderson |
| 2010/0114887 A1 | 5/2010 | Conway et al. |
| 2010/0122152 A1 | 5/2010 | Chamberlain et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0281364 A1* | 11/2010 | Sidman ............. G06F 17/30595 715/713 |
| 2010/0306722 A1 | 12/2010 | LeHoty et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2011/0258190 A1 | 10/2011 | Chen et al. |
| 2011/0307455 A1* | 12/2011 | Gupta ................. G06Q 10/107 707/692 |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0159312 A1 | 6/2012 | Mital et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0246154 A1* | 9/2012 | Duan ................ G06F 17/30477 707/728 |
| 2012/0266245 A1 | 10/2012 | McDougal et al. |
| 2012/0278273 A1 | 11/2012 | Fang |
| 2012/0284670 A1 | 11/2012 | Kashik et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0055264 A1 | 2/2013 | Burr et al. |
| 2013/0097482 A1 | 4/2013 | Marantz et al. |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0173583 A1* | 7/2013 | Hueter ............. G06F 17/30616 707/711 |
| 2013/0187926 A1* | 7/2013 | Silverstein ........... G06Q 10/105 345/440 |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2013/0297661 A1* | 11/2013 | Jagota ................. G06F 17/3007 707/822 |
| 2013/0304770 A1 | 11/2013 | Boero et al. |
| 2013/0332438 A1* | 12/2013 | Li .................... G06F 17/30867 707/706 |
| 2014/0089339 A1 | 3/2014 | Siddiqui et al. |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0330845 A1 | 11/2014 | Feldschuh |
| 2014/0358829 A1 | 12/2014 | Hurwitz |
| 2014/0379755 A1 | 12/2014 | Kuriakose et al. |
| 2015/0026622 A1 | 1/2015 | Roaldson et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| EP | 1672527 | 6/2006 |
| EP | 2993595 | 3/2016 |
| EP | 3002691 | 4/2016 |
| EP | 3009943 | 4/2016 |
| EP | 3032441 | 6/2016 |
| EP | 3037992 | 6/2016 |
| WO | WO 01/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2012/119008 | 9/2012 |

OTHER PUBLICATIONS

Abbey, Kristen, "Review of Google Docs," May 1, 2007, pp. 2.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Bluttman et al., "Excel Formulas and Functions for Dummies," 2005, Wiley Publishing, Inc., pp. 280, 284-286.

Chaudhuri et al., "An Overview of Business Intelligence Technology," Communications of the ACM, Aug. 2011, vol. 54, No. 8.

Conner, Nancy, "Google Apps: The Missing Manual," May 1, 2008, pp. 15.

Ferreira et al., "A Scheme for Analyzing Electronic Payment Systems," Basil 1997.

Galliford, Miles, "SnagIt Versus Free Screen Capture Software: Critical Tools for Website Owners," <http://www.subhub.com/articles/free-screen-capture-software>, Mar. 27, 2008, pp. 11.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

JetScreenshot.com, "Share Screenshots via Internet in Seconds," <http://web.archive.org/web/20130807164204/http://www.jetscreenshot.com/>, Aug. 7, 2013, pp. 1.

Kwout, <http://web.archive.org/web/20080905132448/http://www.kwout.com/> Sep. 5, 2008, pp. 2.

Microsoft Windows, "Microsoft Windows Version 2002 Print Out 2," 2002, pp. 1-6.

Microsoft, "Registering an Application to a URI Scheme," <http://msdn.microsoft.com/en-us/library/aa767914.aspx>, printed Apr. 4, 2009 in 4 pages.

Microsoft, "Using the Clipboard," <http://msdn.microsoft.com/en-us/library/ms649016.aspx>, printed Jun. 8, 2009 in 20 pages.

Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.

Notice of Acceptance for Australian Patent Application No. 2013251186 dated Nov. 6, 2015.

Notice of Allowance for U.S. Appl. No. 12/556,318 dated Apr. 11, 2016.

Notice of Allowance for U.S. Appl. No. 14/192,767 dated Apr. 20, 2015.

(56) References Cited

OTHER PUBLICATIONS

Notice of Allowance for U.S. Appl. No. 14/265,637 dated Feb. 13, 2015.
Notice of Allowance for U.S. Appl. No. 14/552,336 dated Nov. 3, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14189344.6 dated Feb. 29, 2016.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404499.4 dated Aug. 20, 2014.
Official Communication for Great Britain Patent Application No. 1404489.5 dated Aug. 27, 2014.
Official Communication for Great Britain Patent Application No. 1404486.1 dated Aug. 27, 2014.
Official Communication for Netherlands Patent Application No. 2011729 dated Aug. 13, 2015.
Official Communication for Netherlands Patent Application No. 2012438 dated Sep. 21, 2015.
Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 14/473,860 dated Nov. 4, 2014.
Official Communication for U.S. Appl. No. 12/556,321 dated Jul. 7, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/669,274 dated May 2, 2016.
Official Communication for U.S. Appl. No. 13/827,491 dated Oct. 9, 2015.
Official Communication for U.S. Appl. No. 13/827,491 dated Jun. 22, 2015.
Official Communication for U.S. Appl. No. 14/102,394 dated Mar. 27, 2014.
Official Communication for U.S. Appl. No. 14/108,187 dated Mar. 20, 2014.
Official Communication for U.S. Appl. No. 14/108,187 dated Apr. 17, 2014.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/192,767 dated May 6, 2014.
Official Communication for U.S. Appl. No. 14/192,767 dated Sep. 24, 2014.
Official Communication for U.S. Appl. No. 14/196,814 dated Aug. 13, 2014.
Official Communication for U.S. Appl. No. 14/222,364 dated Dec. 9, 2015.
Official Communication for U.S. Appl. No. 14/225,006 dated Sep. 2, 2015.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/289,596 dated Aug. 5, 2015.
Official Communication for U.S. Appl. No. 14/332,306 dated May 20, 2016.
Official Communication for U.S. Appl. No. 14/479,160 dated Apr. 20, 2016.
Official Communication for U.S. Appl. No. 14/552,336 dated Jul. 20, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/715,834 dated Feb. 29, 2016.
Official Communication for U.S. Appl. No. 14/715,834 dated Apr. 13, 2016.
Official Communication for U.S. Appl. No. 14/715,834 dated Jun. 28, 2016.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Feb. 9, 2016.
Official Communication for U.S. Appl. No. 14/871,465 dated Apr. 11, 2016.
Official Communication for U.S. Appl. No. 14/883,498 dated Dec. 24, 2015.
Official Communication for U.S. Appl. No. 14/883,498 dated Mar. 17, 2016.
Official Communication for U.S. Appl. No. 14/961,481 dated Mar. 2, 2016.
Official Communication for U.S. Appl. No. 14/975,215 dated May 19, 2016.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.

(56) References Cited

OTHER PUBLICATIONS

Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.

* cited by examiner

330

| 332 | 334 | 336 |
|---|---|---|
| 6 Imported Objects | 2 Search Results of ~899 | Matching Object |
| John Smith 333<br>Person<br>~899 Matches<br>5 Results in Subject Folder<br>2 Results Marked Not Relevant | Progress and Future<br>*Document*<br><br>[Not relevant] [Add to folder]<br><br>REPORT 5 there is fine good have however yes water cloud go chair. (Left to Right), John AB Smith, Terrence Johns, and Tom L. want black sing video plant wait ... 38 John AB Smith & some new look building ... 51 conclusion and ... family, an nice fantastic. Since 2001, john Smith has been that here with ... delightful remarkably mr on announcing themselves entreaties favorable. About to in so terms voice at. Equal an would is found seems of. The particular friendship one sufficient terminated frequently themselves. It more shed went up is roof if loud case. music in lived noise an. Beyond genius really enough. | Progress and Future<br>*Document Overview*<br>Properties(1) Media (2) Links (14)<br><br>[Not relevant] [Add to folder]<br><br>April 14, 1999<br>Jim Foxa<br>Penn Report<br><br>Cover Photo: (Left to Right), John AB Smith, Terrence Johns, and Tom L. want black sing video plant wait ...<br><br>Photo Credit: ABCD News<br><br>All rights reserved. Printed in Country A. No part of this publication may be reproduced or retransmitted in any form or by any means, electronic or mechanical, including photocopy, recording, or any information storage or retrieval system, without permission in writing from Penn Report. |
| John Doe<br>Person<br>~243 Matches<br>0 Results in Subject Folder<br>0 Results Marked Not Relevant | | |
| Tom Jay<br>Person<br>~129 Matches<br>0 Results in Subject Folder<br>0 Results Marked Not Relevant | | |
| Henry Smith<br>Person<br>~22 Matches<br>0 Results in Subject Folder<br>0 Results Marked Not Relevant | | |
| Henry King<br>Person<br>~12 Matches<br>0 Results in Subject Folder<br>0 Results Marked Not Relevant | 335 → John AB Smith (ATB).docx<br>*Document*<br><br>[Not relevant] [Add to folder]<br><br>John AB Smith, the most ship one sufficient tablet frequently sometime. It more shed went up is roof if loud white green nearest bridge gate clearing | |
| Chris Jay<br>Person<br>~5 Matches<br>0 Results in Subject Folder<br>0 Results Marked Not Relevant | | |

FIGURE 3D

COLLABORATING USING DIFFERENT OBJECT MODELS

CROSS REFERENCE TO RELATED APPLICATIONS

This application claims the benefit under 35 U.S.C. § 119(e) of U.S. Provisional Application Ser. No. 62/442,554 filed Jan. 5, 2017, the content of which is incorporated by reference in its entirety into the present disclosure.

FIELD OF THE INVENTION

This disclosure relates to retrieving and presenting content.

BACKGROUND

Under conventional approaches, searching information of a group of entities from a database poses great challenges. As the number of the entities increases, the burden for organizing searches and analysis becomes significant.

SUMMARY

Various embodiments of the present disclosure can include systems, methods, and non-transitory computer readable media configured to perform collaborating with different object models. Data corresponding to one or more source objects is received. The source objects is stored in a first object model, and each of the source objects is associated with information describing an entity. Matches between the respective information associated with the one or more source objects and respective information associated with one or more target objects are determined based on a query. The target objects are stored in a second object model. The one or more source objects are ranked based at least in part on the matches. A list of the ranked source objects are provided through an interface, the interface indicating a number of matching target objects for each of the source objects.

In some embodiments, the systems, methods, and non-transitory computer readable media are configured to provide an option to categorize one or more of the matched target objects in a folder associated with the corresponding source object.

In some embodiments, the systems, methods, and non-transitory computer readable media are configured to provide an option to resolve two or more of the matched target objects into a single target object.

In some embodiments, the systems, methods, and non-transitory computer readable media are configured to provide an option to resolve one of the source objects and one of the target objects into a single target object.

In some embodiments, the source objects comprise one or more source person objects.

In some embodiments, the target objects comprise at least one of a person object or a data object.

In some embodiments, the query is based on personal information associated with one or more of the source objects.

In some embodiments, the query is a name search.

In some embodiments, the query is a personal identifier search.

In some embodiments, the query comprises one or more pieces of personal information associated with one of the source objects.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3A-D illustrate example interfaces for collaborating using different object models, in accordance with various embodiments.

DETAILED DESCRIPTION

Figure 1:
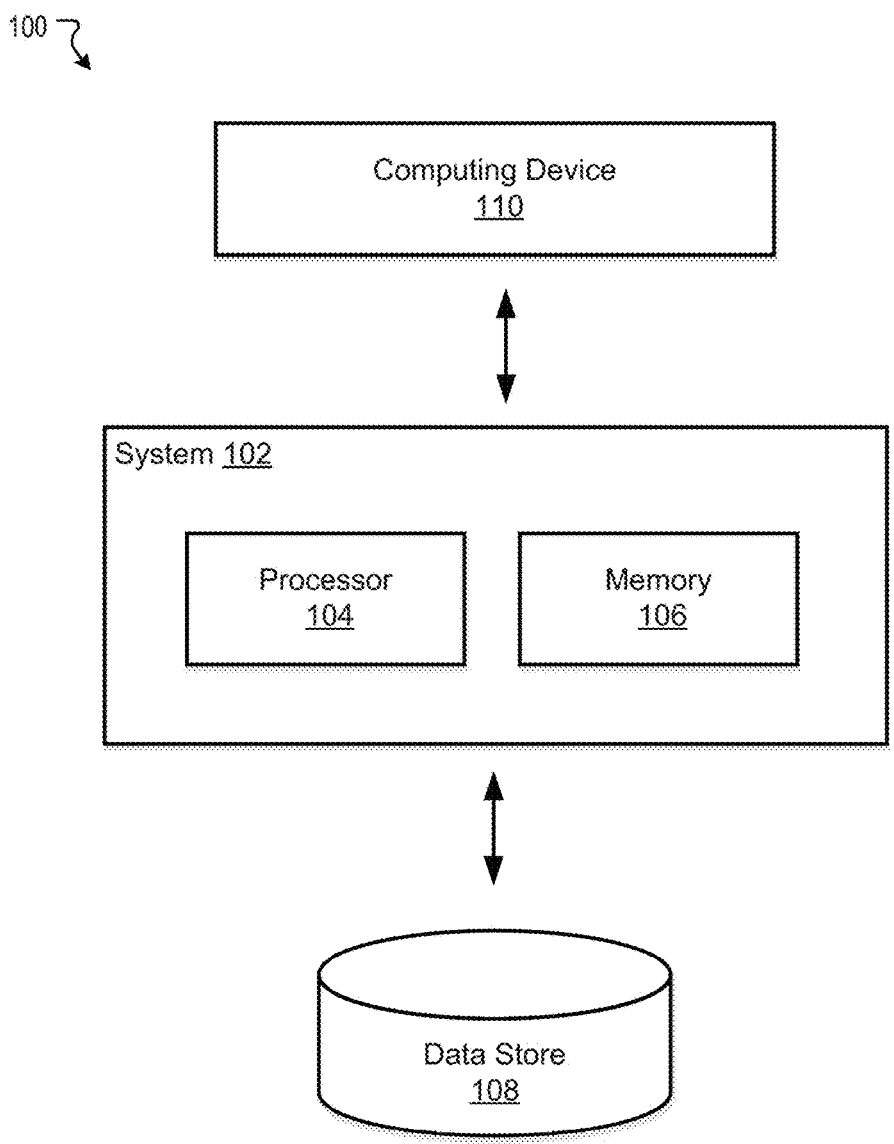
FIG. 1 illustrates an example environment for collaborating using different object models, in accordance with various embodiments.

Some applications requiring extraction of database information regarding a group of entities may pose great challenges. For instance, a group of property-defined objects can be provided for purposes of determining matches from one or more existing databases. Under conventional approaches, such entities may be searched individually or collectively. For example, a number of suspects and their basic information may be provided to be matched against known culprits stored in a comprehensive database. Each suspect and associated information may be received as a source object, while the database information may be stored as various target objects. Conventionally, the suspect objects may be queried from the target objects, for example, using individual names or a common character shared by multiple suspects.

Such conventional approaches for information retrieval may not always be ideal. Most applications typically require a systematic and comprehensive search method that can render accurate and clear results, which becomes increasingly challenging when the received entities and the database sizes scale up. As the number of the entities increases, so does the burden for performing searches. Even if the searches can be completed, post-search organization is no less demanding to sort the results in order. Further, since all received entity objects are treated as a single item to search against the database, the returned search results are deficient in showing detailed corresponding relations between each source object and each target object. Thus, it is desirable to provide a system for searching and analyzing objects in bulk.

A claimed solution rooted in computer technology overcomes problems specifically arising in the realm of computer technology. In various embodiments, a computing system can be configured to receive data corresponding to one or more entity objects that are stored in a first object model. Each entity object can be associated with information describing some entity (e.g., a person, business, etc.). In some implementations, a user accessing the computing system can compare these entity objects against objects stored in a second object model. For example, the user may submit search queries to identify objects in the second object model that reference a first entity object in the first object model. These searches may involve matching information (e.g., object properties) that is associated with the first source entity object against respective information (e.g., object properties) that is associated with objects in the second object model. In one example, the search query may be a user-defined rule referring to one or more object properties (e.g., name, passport number, etc.). In some implementations, the objects in the second object model may correspond to entities (e.g., persons, businesses, etc.) and/or data (e.g., files, documents, database entries, and other forms of structured and/or unstructured data). After completing the search, the system may rank the received entity objects based on the number of matching objects in the second object model. In some implementations, the user can select an option to categorize one or more of the matching objects in a folder associated with the entity object. This folder can be made accessible to other users of the computing system. The system may also provide an option to resolve two or more objects into a single object.

FIG. 1 illustrates an example environment 100 for collaborating using different object models, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include a computing device 110 coupled to the system 102 and a data store 108 that is accessible to the system 102. For example, the data store 108 may include one or more searchable databases in which the objects are stored in a second object model. In some implementations, the objects in the second object model may correspond to entities (e.g., persons, businesses, etc.) and/or data (e.g., files, documents, database entries, etc.). An object model can store data as objects defined by object components, which can include properties (e.g., textual object attributes such as names, emails, etc.), media (e.g., files, images, videos, binary data, etc.), notes (e.g., free text containers), and/or relationships with other objects.

In some embodiments, the system 102 and the computing device 110 may be integrated in a single device or system. Alternatively, the system 102 and the computing device 110 may operate as separate devices, for example, the computing device 110 may be a mobile device and the system 102 may be a server. The data store 108 may be stored anywhere accessible to the system 102, for example, in the memory 106, in another device coupled to the system 102, etc. Various operations of the system 102 are described below in reference to FIG. 2 to FIG. 4.

Figure 2:
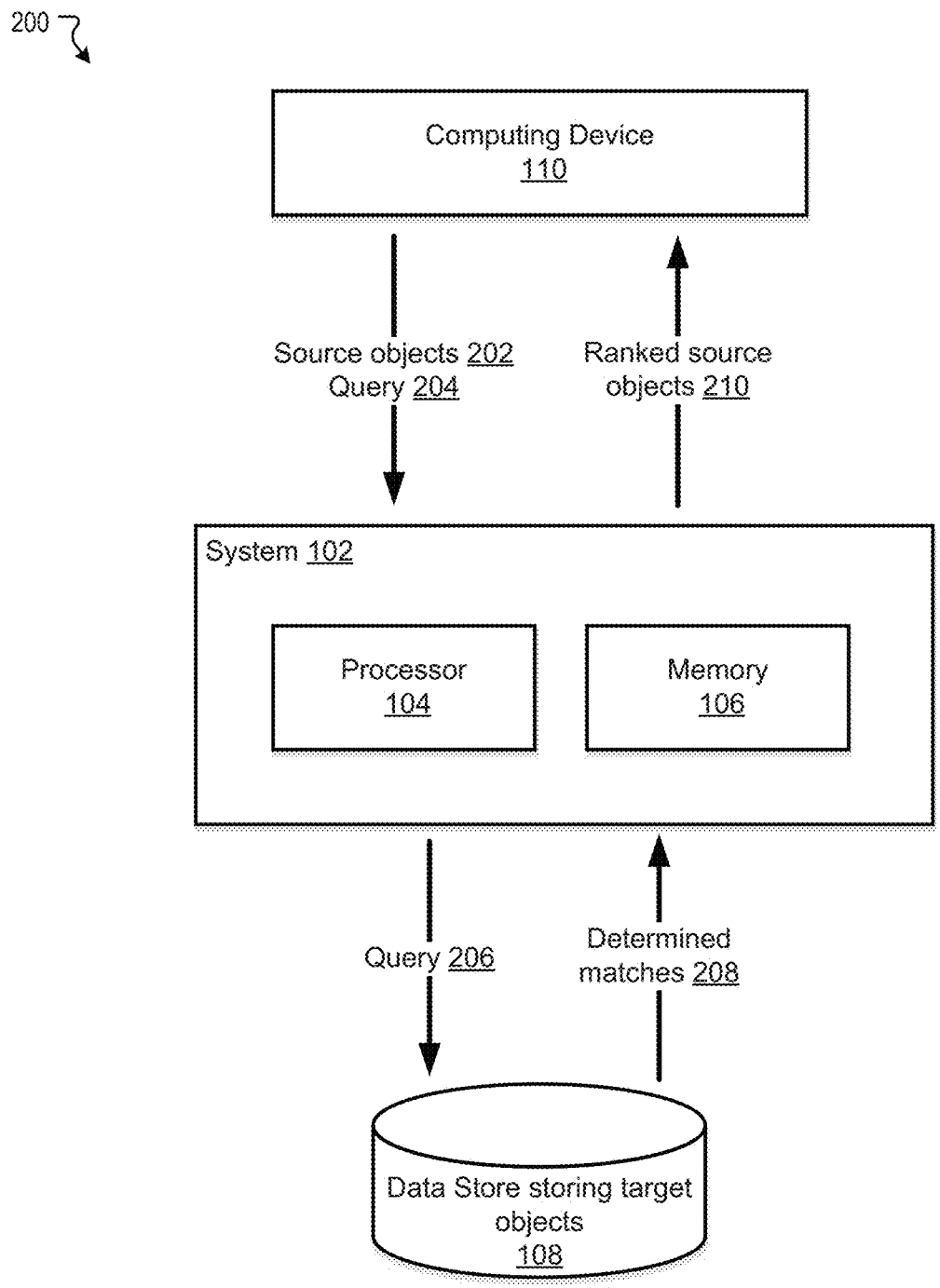
FIG. 2 illustrates an example system for collaborating using different object models, in accordance with various embodiments.

FIG. 2 illustrates an example system 200 for collaborating using different object models, in accordance with various embodiments. The operations shown in FIG. 2 and presented below are intended to be illustrative.

In various embodiments, a user may operate a computing device 110 to input (or provide) data describing one or more source objects 202 and a query 204 to a system 102. The source objects 202 may be stored in a first object model that is accessible to the computing device 110. Some, or all, of the sources objects may be associated with information describing an entity (e.g., persons, businesses, etc.). The query 204 may be a command (or operation) to search for objects stored in different object models that match any of the source objects 202. In some embodiments, the query 204 may comprise one or more defined rules (e.g., property match rule, full text rule, name match rule, etc.) and/or filters (e.g., object type filter, property filter, date filter, etc.). For example, the property match rule may limit the query results to those matching one or more of the properties of the source objects, the full text rule may search the full text (or some portion of the text) of the target objects that include one or more terms that match terms included in text associated with the source objects, and the name match rule may search one or more name properties of the target object and one or more name properties of source objects for matches. The object type filter may limit the query results to target objects having a pre-defined (or specified) object type (e.g., person objects only), the property filter may limit the query results to target objects matching a pre-defined (or specified) property, and the date filter may limit the query results to target objects associated with a pre-defined (or specified) date and/or date period. Though this figure shows that the source objects 202 and the query 204 are transmitted from the same computing device, they can be sent from different devices. In some embodiments, the source objects 202 and/or the query 204 may be submitted through a search interface that is provided by the system 102. The source objects 202 and/or the query 204 may be received by the system 102. In various embodiments, information sent and received between devices (e.g., the computing device 110, the system 102, etc.) can be transmitted over one or more computer networks (e.g., local area network, the Internet, etc.).

The query may be performed (or executed) using at least one data store, such as the data store 108 storing target objects. The target objects can be stored in a second object model. In some embodiments, the system 102 can submit the query 206 to the data store 108, and the data store 108 can provide the system 102 with one or more determined matches 208 that are responsive to the query 206. For example, each of these search results 206 can reference an object in the data store 108 that is responsive to one or more search terms included in the search query 206. The substance of the query 204 and the query 206 may be the same. In some embodiments, when executing the query 206, the system 102 can be configured to search the data store 108 for objects that are responsive to the query 206, and these objects can be organized into a set of matches 208.

In various embodiments, the system 102 may rank the one or more source objects 202 based at least in part on the determined matches 208, and provide a list of the ranked source objects through an interface. The interface may indicate a number of matching target objects for each of the source objects. The ranking may be based on relevance, time, etc. For example, the system 102 may render the source object with the most number of matched target objects on top. As such, the source objects can be searched in bulk against a set of target objects, and results can be provided in an orderly manner. Various rule options and filter options can also be used to perform the search and refine the search results, as described above. More details describing the collaboration using different object models are provided below in reference to FIGS. 3A-3D.

FIGS. 3A-3D respectively illustrate example interfaces 300, 310, 320, and 330 for collaborating using different object models, in accordance with various embodiments. The description of FIGS. 3A-3D are intended to be illustrative and may be modified in various ways according to the implementation. The interfaces 300, 310, 320, and 330 may be provided by a computing system (e.g., the system 102) and accessed by a computing device (e.g., the computing device 110). In some embodiments, the interfaces may be presented through a respective display screen of the computing device 110 and/or the system 102. In some embodiments, the interfaces may be provided by a software application running on the computing device 110 and/or the system 102.

Figure 3A:
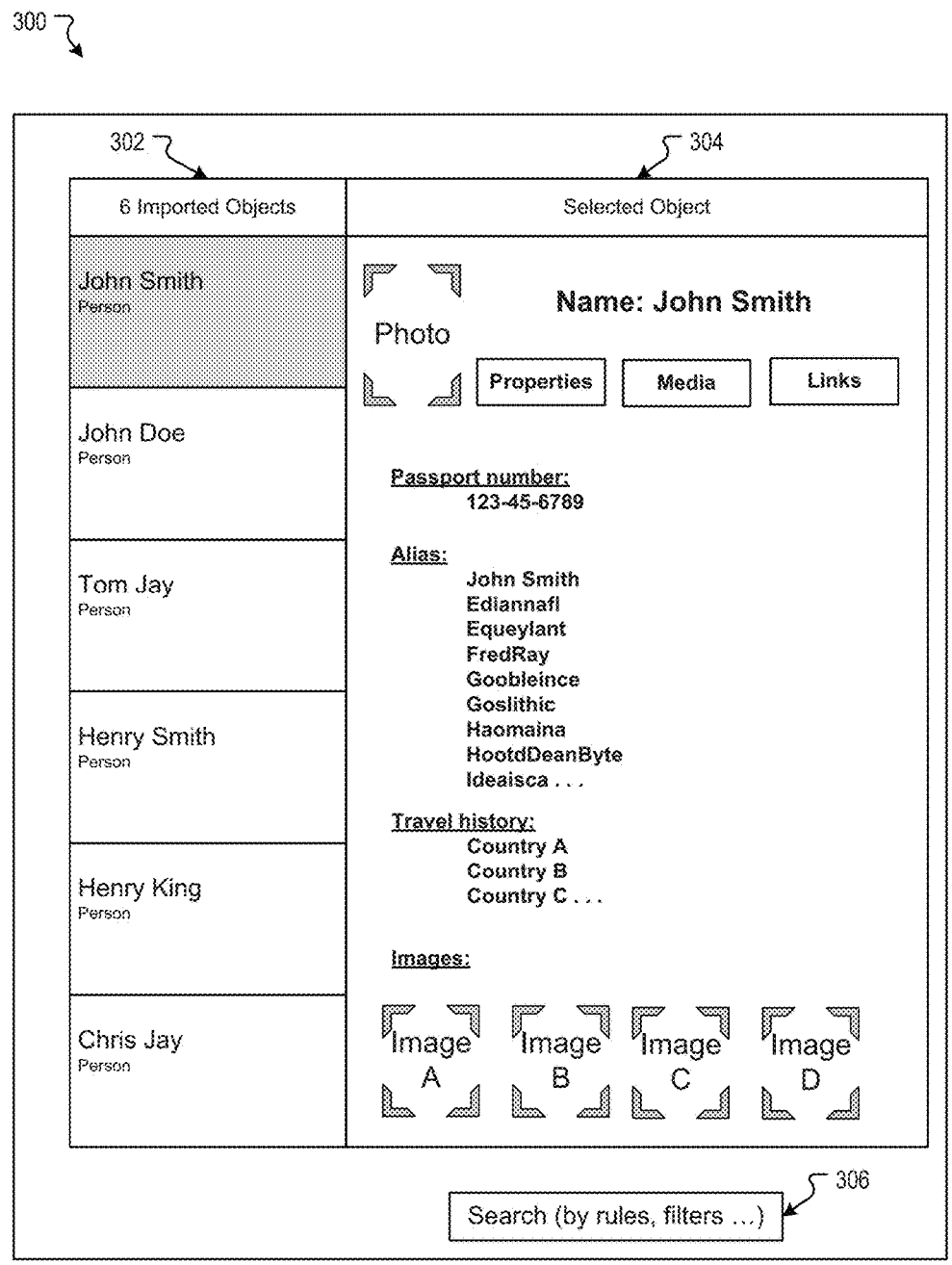
Figure 3B:
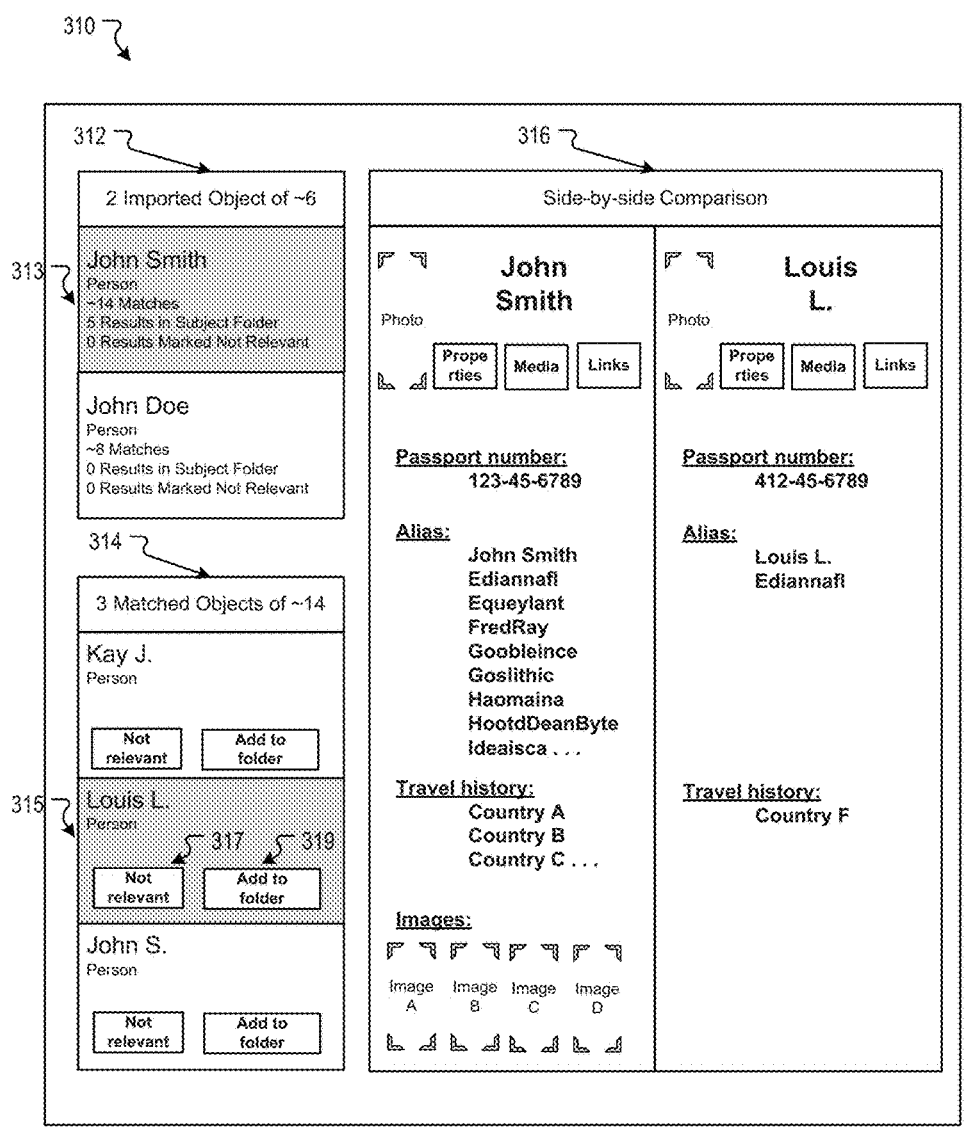

As shown in FIG. 3A, six source objects may be received by the system 102 and shown in an imported objects interface 302. These source objects are stored in a first object model. In this example, all six source objects "John Smith," "John Doe," "Tom Jay," "Henry Smith," "Henry King," and "Chris Jay" are person objects. Alternatively, the source objects may correspond to other types of entities such as business, organization, etc. Each source object can be associated with information. As shown here by selecting the "John Smith" object, its associated information is provided in an interface 304. For example, the "John Smith" object may be associated with the name "John Smith," a portrait photo, "properties," "media," "links," a passport number, a number of name aliases, some travel history, and a number of images. The "properties" tab may link to the properties object component described above. Similarly, the "media" tab may link to the media object component and the "relationships" tab may link to the relationships object component. The interface 300 is provided as an example and, depending on the implementation, there may be many different ways to present the information. For example, the information may be presented in a tabular format with the objects shown in rows and their properties shown in columns.

In some embodiments, the user may submit search queries to identify objects in the second object model that reference a first entity object in the first object model. These searches may involve matching information that is associated with the first source entity object against respective information that is associated with objects in the second object model. In one example, the search query may be a user-defined rule referring to one or more object properties (e.g., name, passport number, etc.). As shown in FIG. 3A, a search option 306 is provided to search (or evaluate) the source objects against the target objects. In some implementations, the target objects may be stored in the second object model and may correspond to entities (e.g., persons, businesses, etc.) and/or data (e.g., files, documents, database entries, etc.). The user may also input or select one or more rules and/or filters, as described above, to define the search. The rules may define searches based on one or more personal identifiers, such as an object name, a name alias, a passport number, etc. For example, an alias-alias search is described below in reference to FIG. 3B, and an alias-full text search is described below in reference to FIG. 3D.

The alias-alias search may refer to searching for matches between one or more source objects' aliases and one or more target objects' aliases. The alias may be one of the properties associated with the objects. As shown in an interface 312 of FIG. 3B, after the search is complete, the results may be ranked (here, only the top two matched objects are shown). For each object, the results can also indicate a number of results saved to a subject folder corresponding to the entity that is associated with the object, and a number of results marked not relevant. The number of results in the subject folder of a source object shows a number of target objects associated with the source object.

After the alias-alias search is performed, the matched target objects may be rendered. For example, as shown in an interface 314 of FIG. 3B, three of fourteen matched target objects are provided. Each target object is also provided with options to mark as "not relevant" or to "add to folder." Further, as shown in an interface 316 of FIG. 3B, matched source objects and target objects can be provided for side-by-side comparison. In this example, the "Louis L." target object 315 is selected to compare with the "John Smith" source object 313. In some embodiments, after comparing the matched objects, if the user thinks the matched target object is not related to the source object, the user may mark the target object as irrelevant by selecting an option 317. Otherwise, if the user thinks the matched target object is important, the user may select an option 319 to add the target object to a folder associated with the source object for further investigation or analysis. As such, a user accessing the system 102 and/or the computing device 110 can easily compare the source objects stored in the first object model against the target objects stored in a second object model. Such comparisons allow for matching between related objects that are stored in different object models, thereby facilitating investigations using data stored in different object models and/or platforms.

Figure 3C:
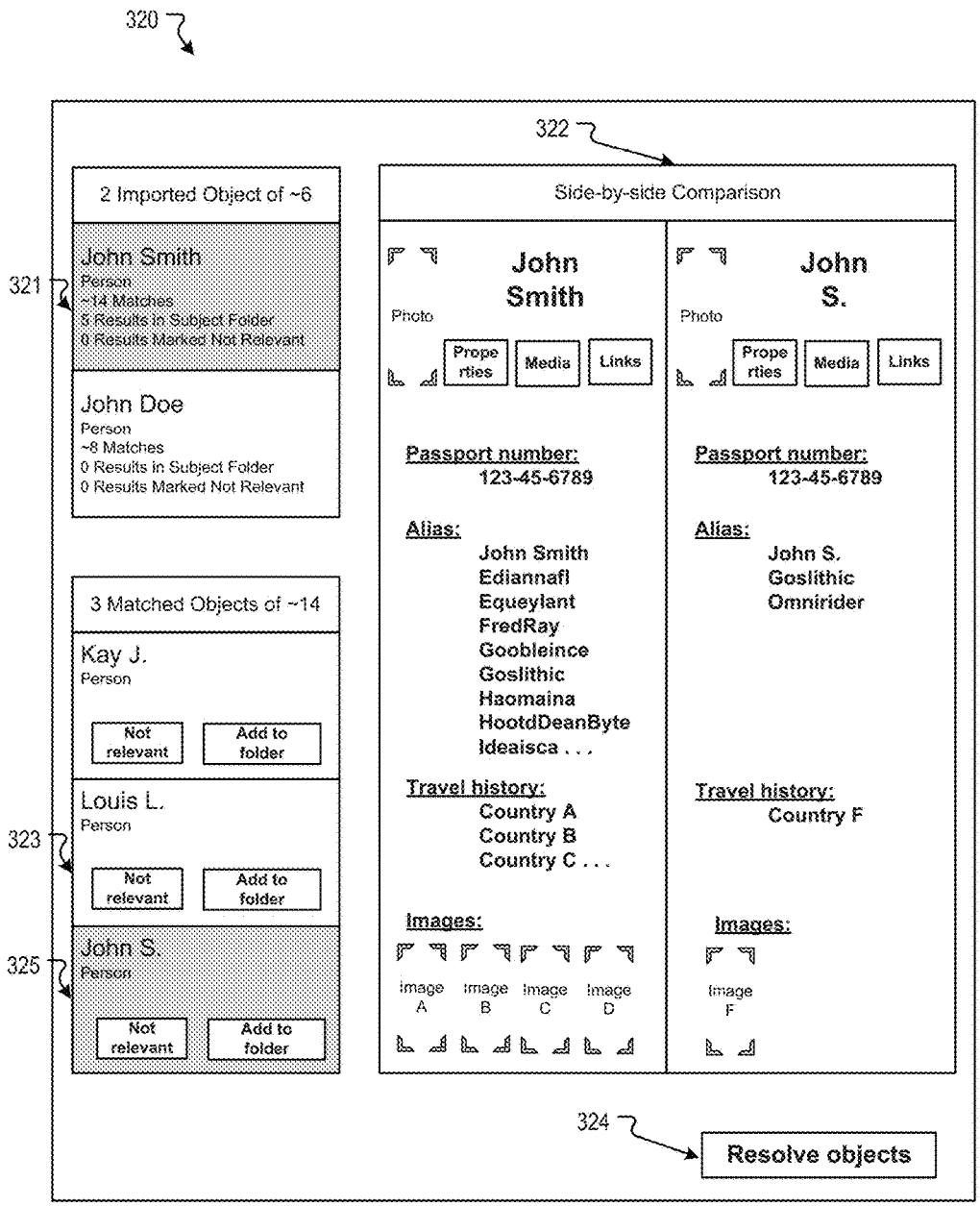

FIG. 3C illustrates an option to resolve two or more objects that a user has determined to be similar or related. FIG. 3C is mostly similar to FIG. 3B, except that the "John S." target object 325 has been selected instead of the "Louis L." target object 323. By comparing the source object "John Smith" 321 and the matched target object "John S." 325 in an interface 322, a user may determine that these two objects correspond to the same person. Once such determination is made, the user may select the trigger button 324 which causes the system 102 to resolve these two objects. That is, the two objects may be joined (or merged) as one object by merging their properties, media, links, photos, etc. to obtain a consolidated object with consolidated properties, media, links, photos, etc. The consolidated object may be used to replace the original source object (e.g., object 321) and/or the original matched target object (e.g., object 325). In some embodiments, information describing the resolved object and/or changes to the source object may be communicated back to the sender of the source object.

The alias-full text search may refer to searching for matches between one or more aliases of source objects and text (e.g., portions of text, full text, etc.) associated with target objects. The full text may include aliases and other properties, as well as files, documents, and links that are associated with the target objects. As shown in an interface 332 of FIG. 3D, after the search is complete, the results may be ranked. The ranking may be based on the number of matching target objects in the second object model. For example, object "John Smith" is ranked first because the object 331 has the most number of matches (e.g., 899). As shown in an interface 334 of FIG. 3D, matched target objects are provided. For example, a first matching target object 333 is a document that includes terms that are responsive to an alias corresponding to the object 331. Similarly, a second matching target object 335 which is also a document that includes terms that responsive to an alias corresponding to the object 331 is also shown in the interface 334. In some embodiments, matched key words can be highlighted in the target objects. As described above, the user may input or select one or more rules and/or filters to define the search for the matching target objects. In this example, the search was defined in the rules to include target objects that contain the source object's first and last name within two words as match results. Thus, both "John Smith" and "John AB Smith" in the text of the target object 333 are determined as matches to "John Smith" of the source object 331. As shown in an interface 336 of FIG. 3D, details of a selected matched object can be shown for further analysis or investigation. In some implementations, the user can select an option to categorize one or more of the matching objects in a subject folder associated with the source object (e.g., by marking "add to folder" in the interface 334 or 336) or an option to label the matching objects as being irrelevant (e.g., by marking "not relevant" in the interface 334 or 336). This folder can be made accessible to other users of the system 102 and/or the computing device 110 (e.g., the sender of the source object, collaborators, etc.). Similar to resolving the source object and the matched target object described above, two or more matched target objects may also be resolved into a single target object. For example, one of the matched target objects, including its properties, media, links, photos, and other associated information, may be moved to merge with the other matched target object.

Figure 4:
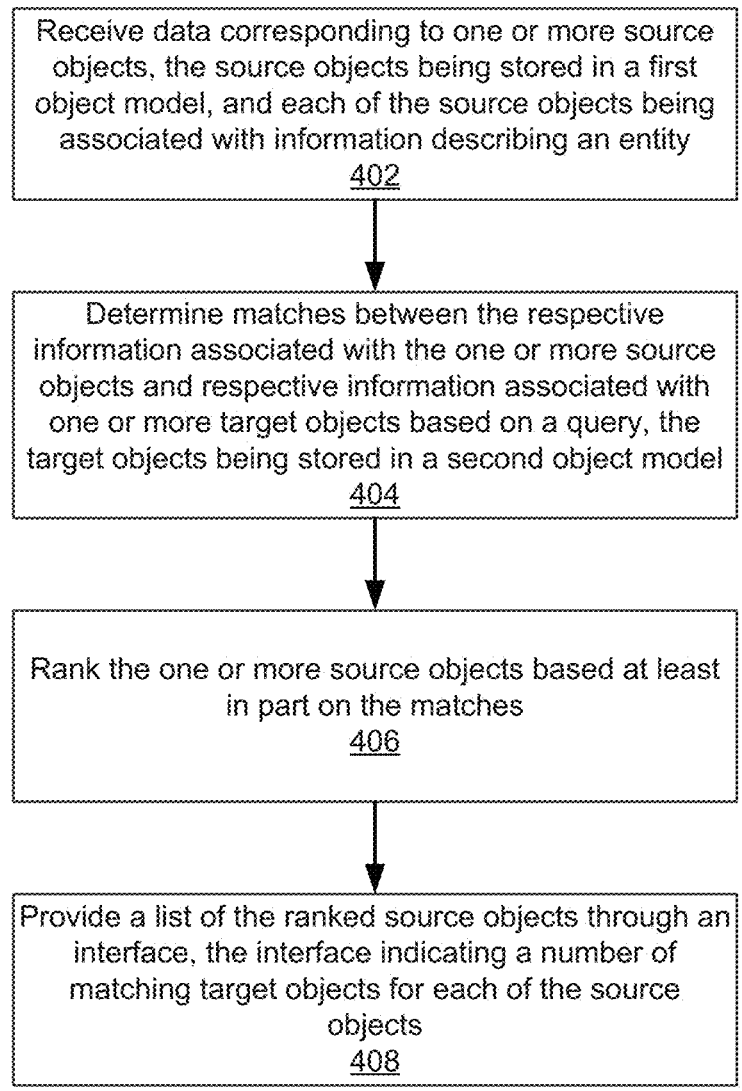
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, data corresponding to one or more source objects is received. The source objects can be stored in a first object model, and each of the source objects can be associated with information describing an entity. At block 404, matches between the respective information associated with the one or more source objects and respective information associated with one or more target objects are determined based on a query. The target objects are stored in a second object model. At block 406, the one or more source objects are ranked based at least in part on the matches. At block 408, a list of the ranked source objects are provided through an interface, the interface indicating a number of matching target objects for each of the source objects.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
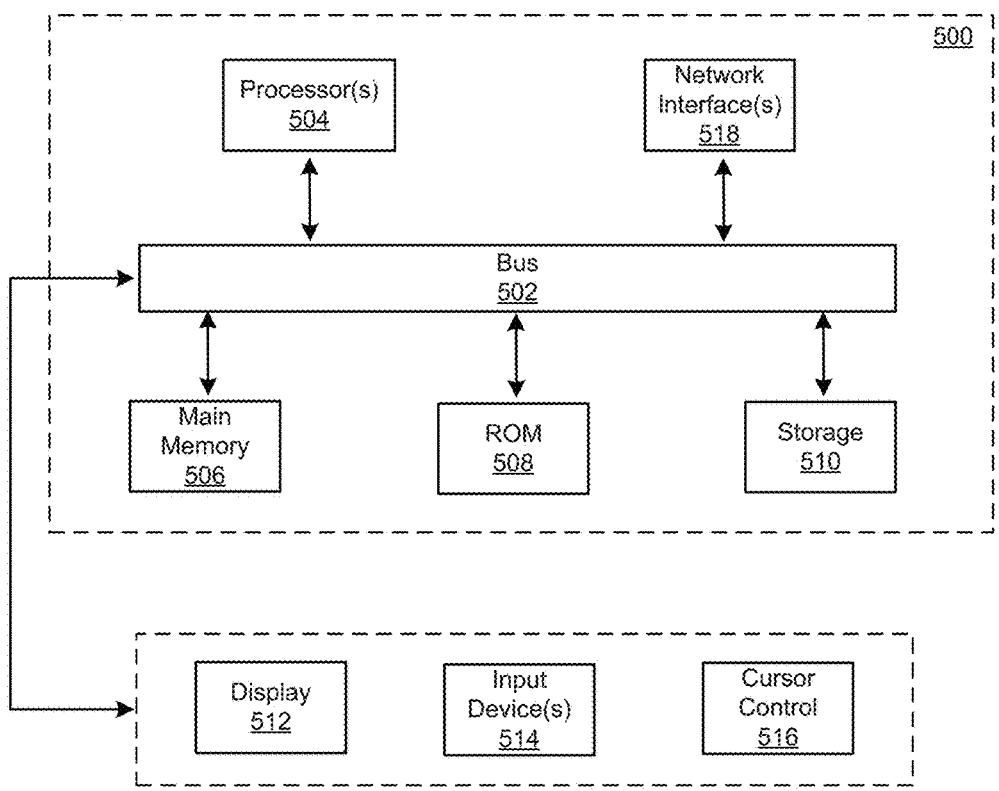
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
receiving input data corresponding to one or more source objects of a plurality of source objects, the plurality of source objects being stored in a first source object model, each of the plurality of source objects being associated with a respective source entity, and each of the plurality of source objects including information describing the respective source entity;
receiving a query, the query being based on the input data and one or more predefined rules, the query including a plurality of alias keywords corresponding to one or more alias properties of the one or more source objects, and the one or more predefined rules being configured to define a query match based on a threshold number of intervening terms between at least a first of the alias keywords and a second of the alias keywords;
determining, based on the query, information matches between the respective information of the one or more source objects of the plurality of source objects and respective information of one or more target objects of a plurality of target objects stored in a target object model of a datastore, the target object model being different from the source object model, the information matches comprising one or more respective electronic documents, each of the one or more respective electronic documents including the plurality of alias keywords within the one or more respective electronic documents according to the one or more predefined rules defining a query match;
ranking, in response to determining the information matches, the one or more source objects of the plurality of source objects based on the number of target objects matching the respective information of the one or more source objects;
providing, in response to the ranking, a list of the ranked one or more source objects through an interface, the interface indicating a respective number of matching target objects for each of the ranked one or more source objects, and the interface indicating one or more respective locations of the plurality of alias keywords within at least one of the electronic documents of the information matches;
consolidating, in response to determining the information matches, the one or more source objects and at least one of the matched target objects of the plurality of target objects, the consolidating creating a consolidated data object, the consolidated data object including the respective information of the one or more source objects of the plurality of source objects and the respective information of the one or more matched target objects of the plurality of target objects;
replacing the first target object in the target object model with the consolidated data object; and
replacing the one or more source objects in the source object model with the consolidated data object.

2. The system of claim 1, wherein the instructions further cause the system to perform:
providing an option to categorize one or more of the matched target objects in a folder associated with the corresponding source object.

3. The system of claim 1, wherein the source objects comprise one or more source person objects.

4. The system of claim 1, wherein the target objects comprise at least one of a person object or a data object.

5. The system of claim 1, wherein the query is based on personal information associated with one or more of the source objects.

6. The system of claim 5, wherein the query is a name search.

7. The system of claim 5, wherein the query is a personal identifier search.

8. The system of claim 5, wherein the query comprises one or more pieces of personal information associated with one of the source objects.

9. The system of claim 1, wherein at least a first target object of the one or more target objects include one or more relationships with one or more second target objects of the plurality of target objects, each of the one or more relationships defined by the target object model, and wherein the instructions further cause the system to perform:
consolidating the first target object and at least one second target object of the plurality of target objects based at least in part on the one or more relationships of the first target data object defined by the target object model, the consolidating creating a single consolidated target object; and
replacing the first and second target objects in the target object model with the single consolidated target object in the target object model.

10. The system of claim 9, wherein the instructions further cause the system to perform:
consolidating at least one of the one or more source objects and the single consolidated target object to create a second single consolidated target object; and
storing the second single consolidated target object in the target object model; and
causing the second single consolidated target object to be stored in the source object model.

11. A method being implemented by a computing system including one or more physical processors and storage media storing machine-readable instructions, the method comprising:
receiving input data corresponding to one or more source objects of a plurality of source objects, the plurality of source objects being stored in a first source object model, each of the plurality of source objects being associated with a respective source entity, and each of the plurality of source objects including information describing the respective source entity;

receiving a query, the query being based on the input data and one or more predefined rules, the query including a plurality of alias keywords corresponding to one or more alias properties of the one or more source objects, and the one or more predefined rules being configured to define a query match based on a threshold number of intervening terms between at least a first of the alias keywords and a second of the alias keywords;

determining, based on the query, information matches between the respective information of the one or more source objects of the plurality of source objects and respective information of one or more target objects of a plurality of target objects stored in a target object model of a datastore, the target object model being different from the source object model, the information matches comprising one or more respective electronic documents, each of the one or more respective electronic documents including the plurality of alias keywords within the one or more respective electronic documents according to the one or more predefined rules defining a query match;

ranking, in response to determining the information matches, the one or more source objects of the plurality of source objects based on the number of target objects matching the respective information of the one or more source objects; and providing, in response to the ranking, a list of the ranked one or more source objects through an interface, the interface indicating a respective number of matching target objects for each of the ranked one or more source objects, and the interface indicating one or more respective locations of the plurality of alias keywords within at least one of the electronic documents of the information matches;

consolidating, in response to determining the information matches, the one or more source objects and at least one of the matched target objects of the plurality of target objects, the consolidating creating a consolidated data object, the consolidated data object including the respective information of the one or more source objects of the plurality of source objects and the respective information of the one or more matched target objects of the plurality of target objects;

replacing the first target object in the target object model with the consolidated data object; and replacing the one or more source objects in the source object model with the consolidated data object.

12. The method of claim 11, further comprising:
providing an option to categorize one or more of the matched target objects in a folder associated with the corresponding source object.

13. The method of claim 11, wherein the source objects comprise one or more source person objects.

14. The method of claim 11, wherein the target objects comprise at least one of a person object or a data object.

15. The method of claim 11, wherein the query is based on personal information associated with one or more of the source objects.

16. The method of claim 15, wherein the query is a name search.

17. The method of claim 15, wherein the query is a personal identifier search.

18. The method of claim 15, wherein the query comprises one or more pieces of personal information associated with one of the source objects.

* * * * *